(12) United States Patent
Murata

(10) Patent No.: US 6,700,998 B1
(45) Date of Patent: Mar. 2, 2004

(54) IRIS REGISTRATION UNIT

(75) Inventor: Takanori Murata, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/521,417

(22) Filed: Mar. 8, 2000

(30) Foreign Application Priority Data

Apr. 23, 1999 (JP) .......................................... 11-116097

(51) Int. Cl.$^7$ ................................................. G06K 9/00
(52) U.S. Cl. ........................ 382/117; 382/115; 382/190
(58) Field of Search ................................ 382/117, 115, 382/118–119, 124–127, 217–218; 705/5; 351/210

(56) References Cited

U.S. PATENT DOCUMENTS

| | | | |
|---|---|---|---|
| 4,641,349 A | * 2/1987 | Flom et al. | 382/117 |
| 4,975,969 A | * 12/1990 | Tal | 382/116 |
| 5,291,560 A | * 3/1994 | Daugman | 382/117 |
| 5,572,596 A | * 11/1996 | Wildes et al. | 382/117 |
| 5,956,122 A | * 9/1999 | Doster | 351/210 |
| 6,119,096 A | * 9/2000 | Mann et al. | 705/5 |
| 6,247,813 B1 | * 6/2001 | Kim et al. | 351/206 |
| 6,373,968 B2 | * 4/2002 | Okano et al. | 382/117 |

OTHER PUBLICATIONS

Wildes et al. ("A System for Automated Iris Recognition", IEEE, 1994, pp.: 121–128).*
Wildes ("Iris Recognition: An Emerging Biometric Technology", IEEE 1997, pp.: 1348–1363).*

* cited by examiner

*Primary Examiner*—Leo Boudreau
*Assistant Examiner*—Duy M. Dang
(74) *Attorney, Agent, or Firm*—Rabin & Berdo, P.C.

(57) ABSTRACT

An iris registration unit being capable of preventing a double registration of a same person is provided. An iris degree of similarity judging device, when iris data to be newly registered is inputted into an iris data base, is adapted to judge similarity to all registered iris data stored in the iris data base. Only when the result of the judgement shows that no registered iris data having similarity exceeding a degree of predetermined similarity exist, the inputted iris data is allowed to be registered in the iris data base.

5 Claims, 8 Drawing Sheets

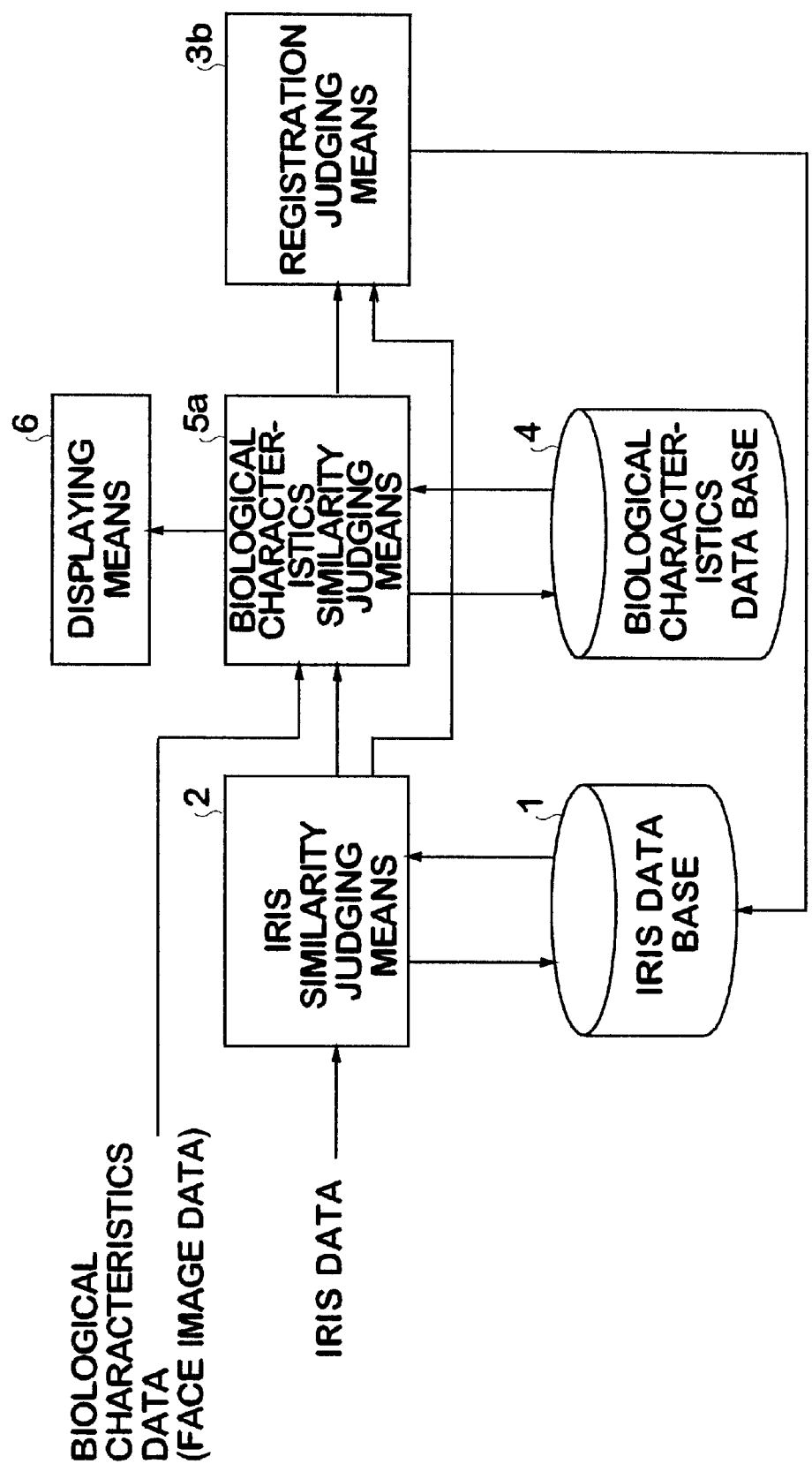

IRIS REGISTRATION UNIT

BACKGROUND OF THE INVENTION

1. Field of the Invention

The present invention relates to an iris registration unit that can be used for an individual identification system employing biological characteristics of a user and an iris of a human in particular.

2. Description of the Related Art

Recently, authentication of personal identification is required in various cases. For example, the personal identification is necessary at the time of repayment by a bank, of borrowing of money using a cash card and a personal identification number and of credit repayment using a credit card and a signature. However, such conventional personal identification methods have problems in that, for example, the cash card or credit card may be stolen and used illicitly by others. To solve this problem, personal identification methods using biological characteristics of a human which defy theft and/or imitation are in the limelight in recent years. A voice, fingerprint, retina, iris and the like can be used as a representation of biological characteristics. Of them, the iris is considered to be most excellent for such personal identification in terms of recognition accuracy, ease of use and the like.

One example of the personal identification using the iris is an ATM (Automatic Teller Machine) incorporating an iris recognition system being capable of authenticating the personal identification by using a cash card and the iris recognition system, instead of using the conventional cash card and personal identification number at the time of repayment and borrowing of money. This method is already demonstrated experimentally at a part of financial institutions.

Thus, by employing the iris recognition system, the personal identification system that defies theft and/or imitation of cards or the like can be implemented.

However, the conventional iris registration unit has a problem. That is, though it can prevent an illicit use of a false user under the pretense of users themselves, it cannot prevent an illicit use of a double (or multiple) registration by users themselves. For example, in the ATM system using the iris recognition system, there may be a case where a user himself or herself makes a double (or multiple) registration under the pretense of a different person to borrow amounts of money exceeding the allowed limit for borrowing.

SUMMARY OF THE INVENTION

In view of the above, it is an object of the present invention to provide an iris registration unit being capable of preventing double registration of iris data.

According to a first aspect of the present invention, there is provided an iris registration unit for preparing an iris data base used for registering iris data obtained from an unregistered user comprising:

iris similarity judging means for judging a degree of similarity between the iris data obtained from the unregistered user and registered iris data already registered in the iris data base; and registration judging means for judging, based on the degree of similarity judged by the iris similarity judging means, similarity and non-similarity of the iris data obtained from the unregistered user to the registered iris data already registered in the iris data base.

In the foregoing, a preferable mode is one wherein the iris registration unit further contains a biological characteristics data base in which biological characteristics data is registered showing biological characteristics corresponding to registered iris data stored in the iris data base and displaying and controlling means, when a judgement as to if there is similarity or not is made by the registration judging means, for displaying biological characteristics based on said biological characteristics data stored in the biological characteristics data base.

According to a second aspect of the present invention, there is provided an iris registration unit for preparing an iris data base used for registering iris data obtained from an unregistered user comprising:

a biological characteristics data base in which biological characteristics data is registered showing biological characteristics corresponding to registered iris data stored in the iris data base;

iris similarity judging means for judging a degree of similarity between the iris data obtained from the unregistered user and the registered iris data base;

biological characteristics similarity judging means for judging a degree of similarity between the biological characteristics data obtained from the unregistered user and registered biological characteristics data stored in the biological characteristics data base; and registration judging means for judging similarity and non-similarity of iris data obtained based on the degree of similarity judged by the iris similarity judging means to the registered iris data and, if similarity exists, for further judging similarity and non-similarity of the biological characteristics data, obtained based on the degree of similarity judged by the biological characteristics similarity judging means to the registered biological characteristics data.

In the foregoing, it is preferable that the iris registration unit further contains displaying and controlling means, when the biological characteristics data obtained is judged by the registration judging means to have no similarity, for displaying biological characteristics based on corresponding registered biological characteristics data.

BRIEF DESCRIPTION OF THE DRAWINGS

The above and other objects, advantages and features of the present invention will be more apparent from the following description taken in conjunction with the accompanying drawings in which:

FIG. 8 is a block diagram showing an iris registration unit according to a third embodiment of the present invention.

DETAILED DESCRIPTION OF THE PREFERRED EMBODIMENTS

Best modes of carrying out the present invention will be described in further detail using various embodiments with reference to the accompanying drawings.

In an iris registration unit according to the present invention, in order to prevent such an illicit use as a double registration (or of a multiple registration) by an user, an registration is allowed only if it can be confirmed that iris data to be newly registered is not already stored in an iris data base.

First Embodiment

Figure 1:
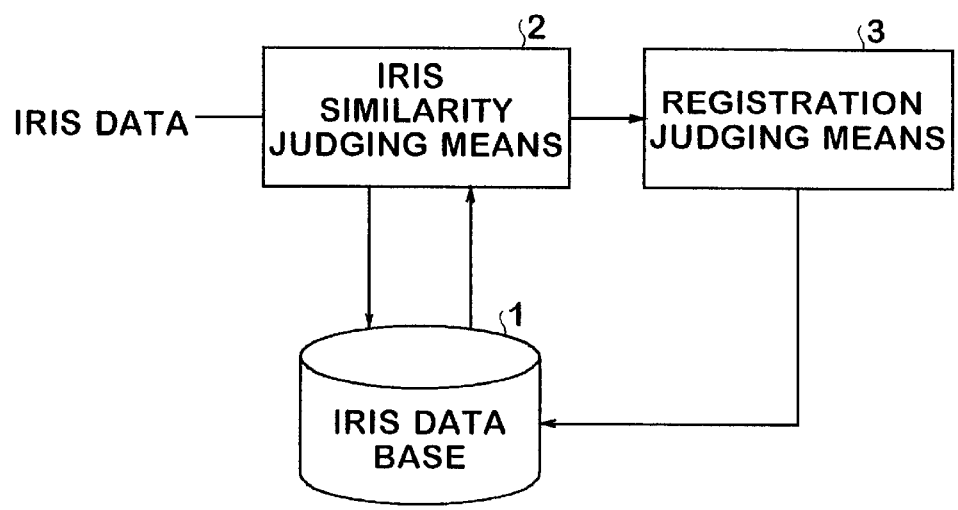
FIG. 1 is a block diagram showing an iris registration unit according to: a first embodiment of the present invention.

FIG. 1 is a block diagram showing an iris registration unit according to a first embodiment of the present invention. As shown in FIG. 1, the iris registration unit is comprised of an iris data base 1, an iris degree of similarity judging means 2 and registration judging means 3.

The iris data base 1 is a data base in which registration iris data of all registrants is stored, which is used as original data for iris checking. The iris degree of the similarity judging means 2 is used, when iris data to be registered is inputted, to judge degree of the similarity between the inputted iris data and all registration iris data stored in the iris data base 1 and to output the result of the judgement. The registration judging means 3 is adapted to register the inputted iris data in the iris data base 1 only when the judgement result obtained by the iris degree of the similarity judging means 2 shows that "there is no registration iris data having similarity exceeding a predetermined degree of the similarity".

Figure 2:
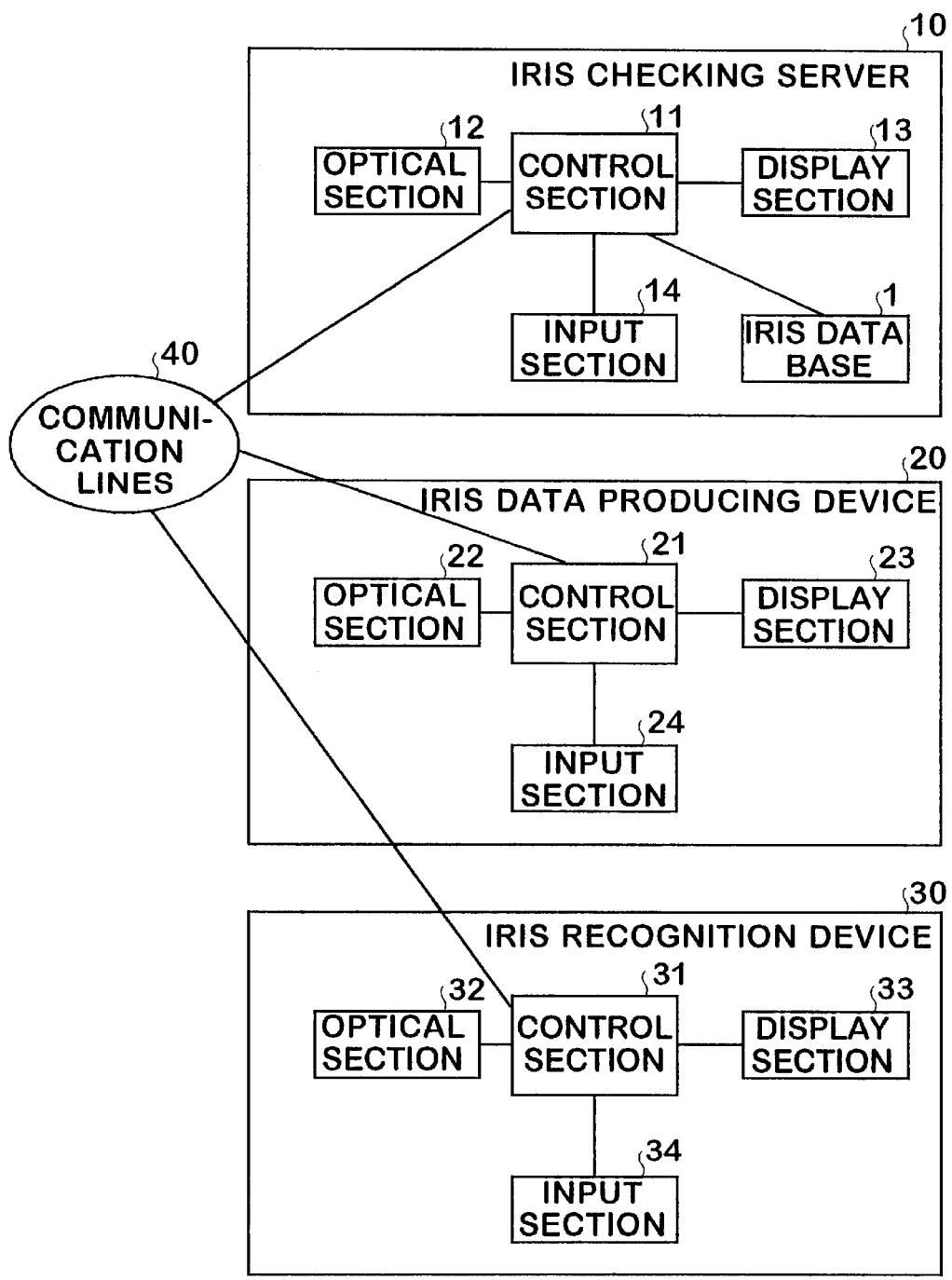
FIG. 2 is a block diagram showing an iris recognition system to implement the iris registration unit of the first embodiment of the present invention.

Next, an example of an iris recognition system incorporating the above iris registration unit is described below. FIG. 2 is a block diagram illustrating the iris recognition system of the present invention. As depicted in FIG. 2, the iris recognition system is comprised of an iris checking server 10, an iris data producing device 20, an iris recognition device 30 and communication lines 40.

The iris checking server 10 has a function of entirely controlling the system containing the iris data producing device 20 and the iris recognition device 30, which comprise a control section 11, an optical section 12, a display section 13, an input section 14 and the iris data base 1.

The control section 11 composed of a server computer is adapted to function not only as a controller to control the whole system including communication systems but also as the iris degree of the similarity judging means 2 and the registration judging means 3. The optical section 12 is used to take a picture of an eye to produce an image of the eye including an iris of an unregistered user, which is comprised of a camera, an area sensor, lens, an illumination device and the like. Since the picture of the eye is ordinarily taken by the iris data producing device 20, the iris checking server 10 does not necessarily contain the optical section.

The display section 13 functions as a display means for displaying results of controlling and recognition and an obtained image of an iris of an eye through a CRT, LCD or the like.

The input section 14 is an inputting means for operating and controlling this system, which is comprised of a key board, a card reader or the like.

The iris data base 1 shown in FIG. 2 is a component being equivalent to the iris data base 1 shown in FIG. 1, which is used for holding iris data of existing registrants and attributes of an ID (Identification Number).

The iris data processing device 20 is used to obtain an image of an eye of an unregistered user and to produce iris data, which is comprised of a control section 21, an optical section 22, a display section 23, an input section 24 or the like. The control section 21 is used to control the whole system including capturing and inputting of the iris image, communications and the like, which is comprised of a personal computer or an exclusive processing device for data production.

The optical section 22 is used to take a picture of an eye for producing an iris image of an unregistered user, which is comprised of a camera, an area sensor, a lens, an illumination device and the like.

The display section 13 is used to display results of controlling and recognition, and an obtained image of an iris of an eye, which is comprised of a CRT, LCD or the like.

The input section 24 is an inputting means for operating and controlling the system, which is comprised of a key board, a card reader and the like.

The iris recognition device 30 is used to perform the iris recognition and composed of a control section 31, an optical section 32, a display section 33, an input section 34 and the like.

The control section 31 is used to control the whole system including capturing and inputting of the iris image and the like, processing of iris recognition, communications and the like, which is comprised of a personal computer or an exclusive processing device for data production.

The optical section 32 is used as a means for taking a picture of an eye to produce iris images of already existing registrants for authenticating personal identification, which is comprised of a camera, an area sensor, a lens, illumination devices and the like.

The display section 33 is a functional section to display results of controlling and recognition, and the obtained image of an iris of an eye, which is comprised of a CRT, LCD or the like.

The input section 34 is an inputting means to operate and control the system, which is comprised of a key board, a card reader and the like.

These iris checking server 10, iris data producing device 20 and iris recognition device 30 are connected through the communication lines 40, which constitutes the whole iris recognition system.

In order to obtain iris data from unregistered users, two or more iris data producing devices 20 are installed, which are connected to the iris checking server 10 via the communication lines. Moreover, many iris recognition devices 30 are installed at each branch of financial institutions so as to be used for authenticating personal identification of registered users.

Operations of the iris registration system according to the first embodiment of the present invention are hereafter described. First, operations of registering an iris are described. The term "registration" represents an operation of an unregistered user's registration of his/her iris characteristics code (or data) prior to his/her use of the iris recognition system.

Figure 3:
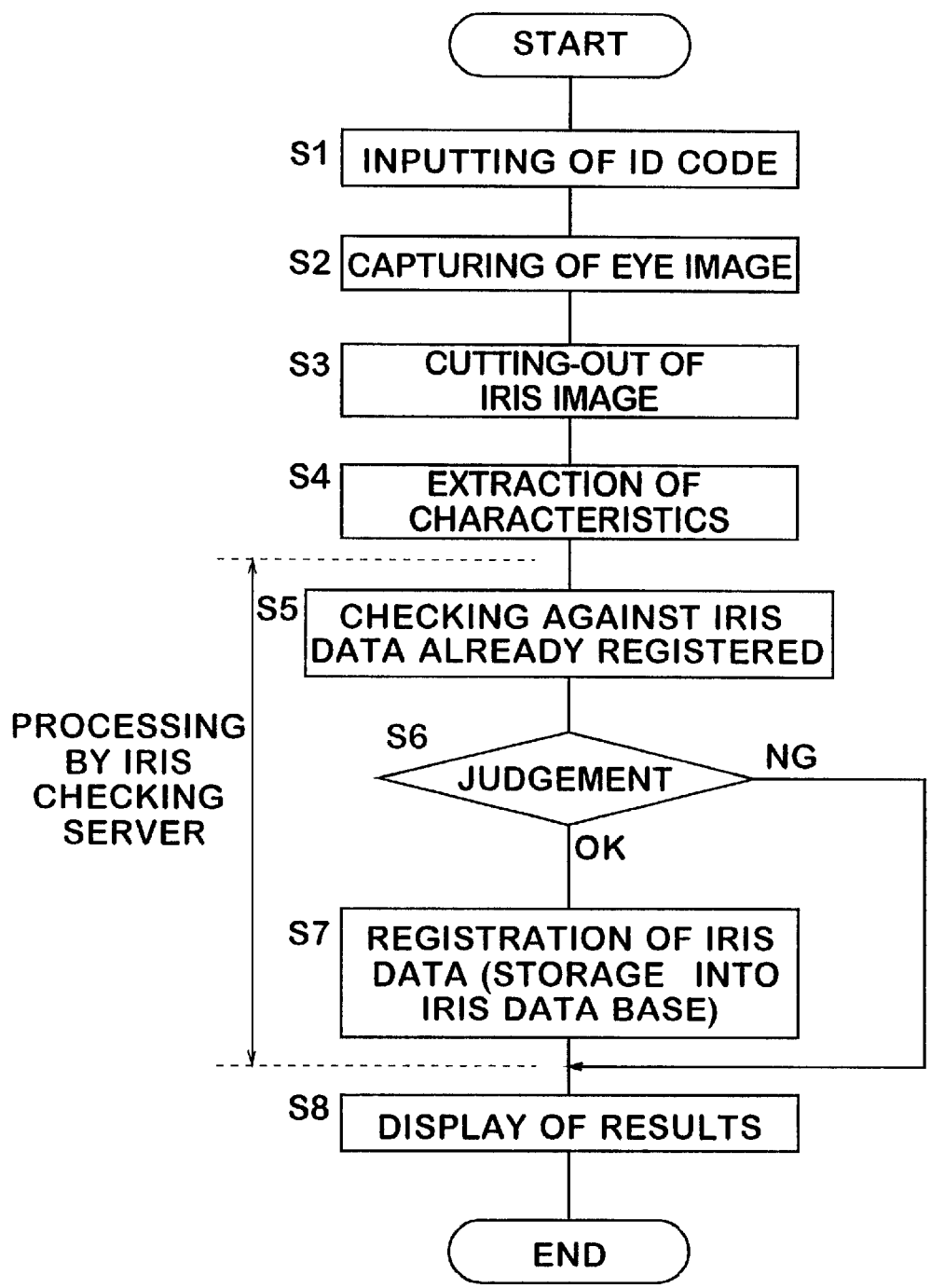
FIG. 3 is a flow chart showing operations of the iris registration of the iris recognition system of the first embodiment of the present invention.

FIG. 3 is a flow chart showing operation of the iris registration of the iris recognition system of the first embodiment of the present invention. In the iris data producing device 20, an ID code of an unregistered user is inputted from the input section 24 such as a keyboard, card reader or the like (Step S1).

Next, an eye image of an unregistered user is captured by the optical section 22 (Step S2).

Then, an iris image is cut out from the eye image by the control section 21 (Step S3), where a boundary between an external edge and an internal edge is detected.

Then, a predetermined amount of the iris image characteristics is extracted from the iris image and coded by the section 21 (Step S4). The amount of the coded iris image characteristics (hereinafter referred to as "iris data") is linked, by the control section, with ID code as personal identification provided to an unregistered user, fed to the iris checking server 10 via communication lines 40 and checked against all iris data already registered and stored in the iris data base 1 (Step S5).

The checking of the iris data fed from the control section 11 against all iris data already registered in the data base 1 is performed by an arithmetic operation of a degree of non-similarity. That is, the arithmetic operation of each data d1, d2, d3, . . . , dn (the "n" is the number of iris data registered) showing a degree of non-similarity against all iris data already registered in the data base 1 is performed. Then, each data d1, . . . , dn showing the degree of non-similarity is compared with a threshold value D (Step S6).

If the degree of non-similarity data d1 to dn obtained from checking exceed the threshold value D (i.e., d>D), it shows that no iris data being very similar (or almost the same as) to that to be newly registered exists in the iris data base 1 and therefore the control section 11 judges the new registration to be not a double one.

On the other hand, at Step S6, if there is data "d" being not more than the threshold value D ($d \leq D$) out of the degree of non-similarity data d1 to "dn" obtained by checking, it shows that iris data being similar (almost the same as) to that to be newly registered exists in the iris data base 1 and therefore the control section 11 judges the new registration to be a double (or multiple) one.

In the judgement processing at Step S6, if a new registration is judged to be not a double one, the control section 11 stores the iris data to be newly registered into the iris data base 1 (Step S7). The result of the above judgement is transferred to the iris data processing device 20 and displayed on the display section 23 (Step S8). The control section 11 of the iris checking server 10 performs processing from Step S5 to Step S7, thus functioning as both the iris degree of similarity judging means 2 and the registration judging means 3.

Figure 4:
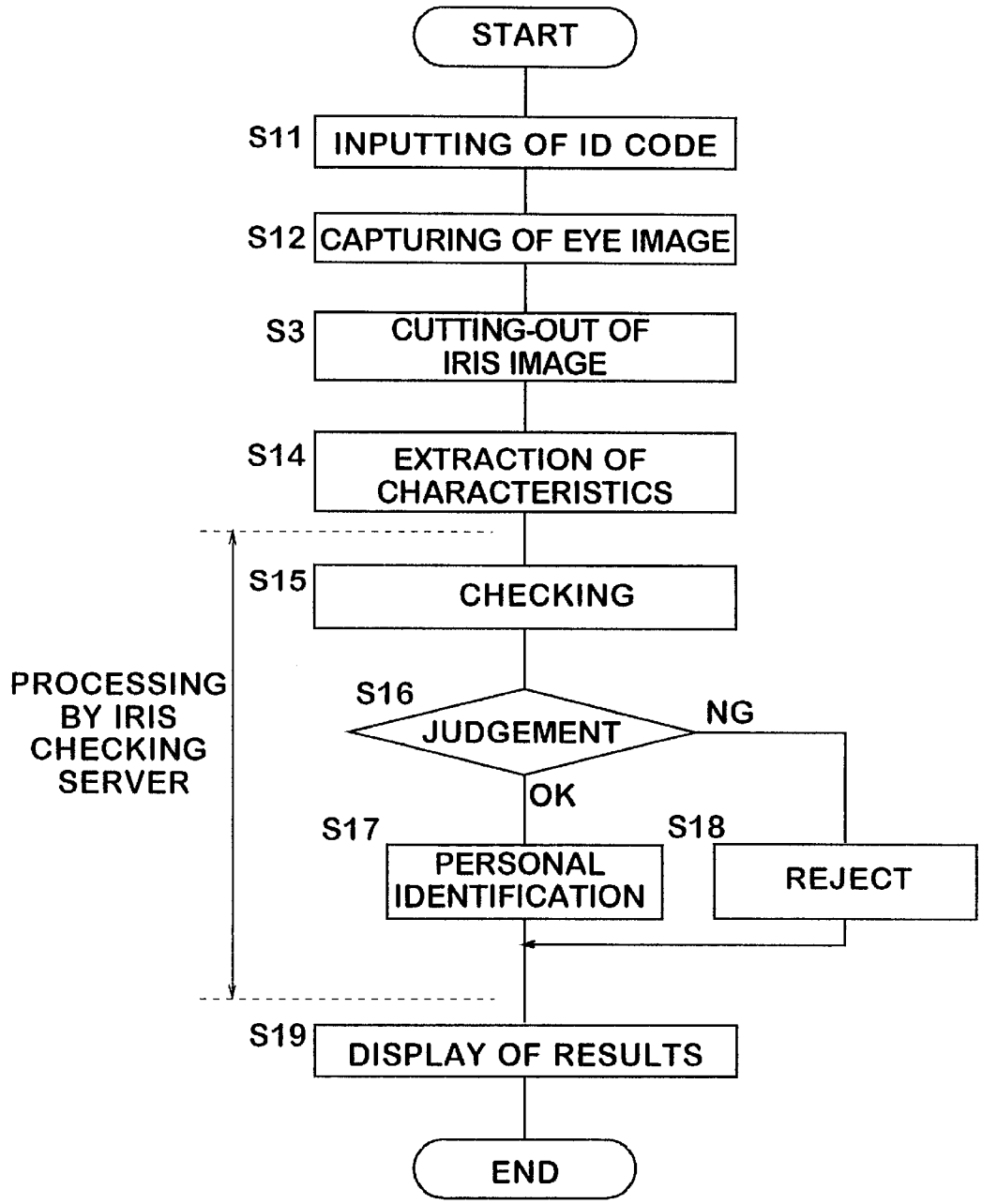
FIG. 4 is a flow chart showing iris recognition operations of the first embodiment of the present invention.

Next, operations of iris recognition are described. FIG. 4 is a flow chart showing iris recognition operations of the first embodiment of the present invention. First, in the iris recognition device 30, an ID code of a user (i.e., an existing registrant) is inputted from the input section 34 such as a key board, card reader and the like (Step S11).

Then, an eye image of the user being an object of personal identification is captured (by the optical section 32) (Step S12).

Then, an iris image of the eye image is cut out by the control section 31 (Step S13), where a boundary between an external edge and an internal edge is detected.

A predetermined amount of the cut-out iris image characteristics is extracted and coded by the control section 31 (Step S14). The iris data is linked, by the control section 31, with ID code of a user and fed to the iris checking server 10 via communication lines 40.

In the iris checking server 10, the control section 11 performs a checking (or matching) of the iris data corresponding to the ID code of the user stored in the iris data base 1 against the transferred iris data (Step S15). The checking is carried out by performing an arithmetic operation of a degree of non-similarity between the transferred iris data and the stored iris data.

If the result of the judgement at Step S16 shows that the degree of non-similarity "d" is not more than a threshold value ($d \leq D$), the iris registration unit authenticates personal identification (Step S17). On the other hand, if the degree of non-similarity obtained by the checking process exceeds the threshold value (d>D), the iris registration unit does not authenticate personal identification and the registration is rejected (Step S18). Then, the result of the personal identification is transferred to the iris recognition device 30 and is displayed on the display section 33 (Step S19).

As described above, according to the first embodiment of the present invention, when an iris data to be registered is inputted, a degree of similarity to all registered iris data stored in the iris data base 1 is judged and only if no registered iris data having similarity exceeding a predetermined a degree of similarity exists, the inputted iris data is newly registered, thus preventing a double (or multiple) registration. As a result, such an illicit use as the double registration of users themselves can be prevented.

Second Embodiment

Figure 5:
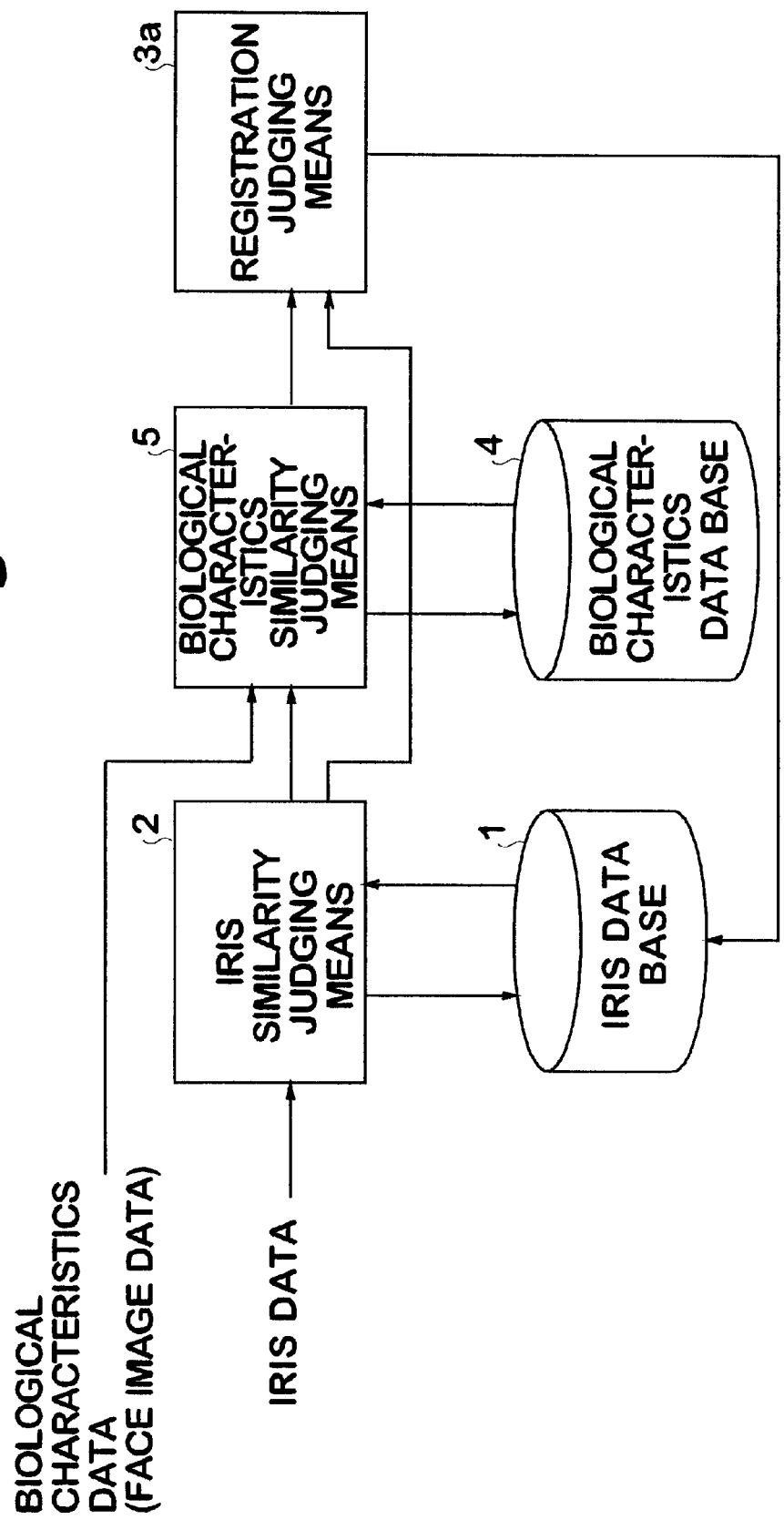
FIG. 5 is a block diagram of an iris registration unit according to a second embodiment of the present invention.

An iris registration unit of a second embodiment has such a configuration as utilizing biological characteristics other than the iris in combination, in addition to configurations provided in the first embodiment. FIG. 5 is a block diagram of the iris registration unit according to a second embodiment of the present invention.

As shown in FIG. 5, the iris registration unit is comprised of an iris data base 1, an iris degree of similarity judging means 2, a registration judging means 3a, biological characteristics data base 4 and a biological characteristics similarity judging means 5.

Since configurations of the iris data base 1 and the iris degree of similarity judging means 2 of the second embodiment are the same as those in the first embodiment, their descriptions are omitted. The registration judging means 3a is basically a means used to judge as to whether an inputted iris data is registered in the iris data base 1. In this embodiment, it judges and controls so that the inputted iris data is allowed to be registered in the iris data base if only no registered biological characteristics data having similarity exceeding the degree of similarity judged by the biological characteristics similarity judging means 5 (i.e., having non-similarity to all registered biological characteristics data exceeding a predetermined threshold value) exists in the biological characteristics data base.

The biological characteristics data base 4 is used to register characteristics data showing biological characteristics other than the iris. In this embodiment, face image data is employed as a biological characteristic other than the iris.

The biological characteristics similarity judging means 5, if the similarity judged by the iris degree of similarity judging means 2 is larger than the threshold value, is adapted to judge the degree of similarity between face image data showing biological characteristics of a new registrant and all face image data (or registered biological characteristics data) stored in the biological characteristics data base 4 and adapted to output the judgement result to the registration judging means 3a.

Figure 6:
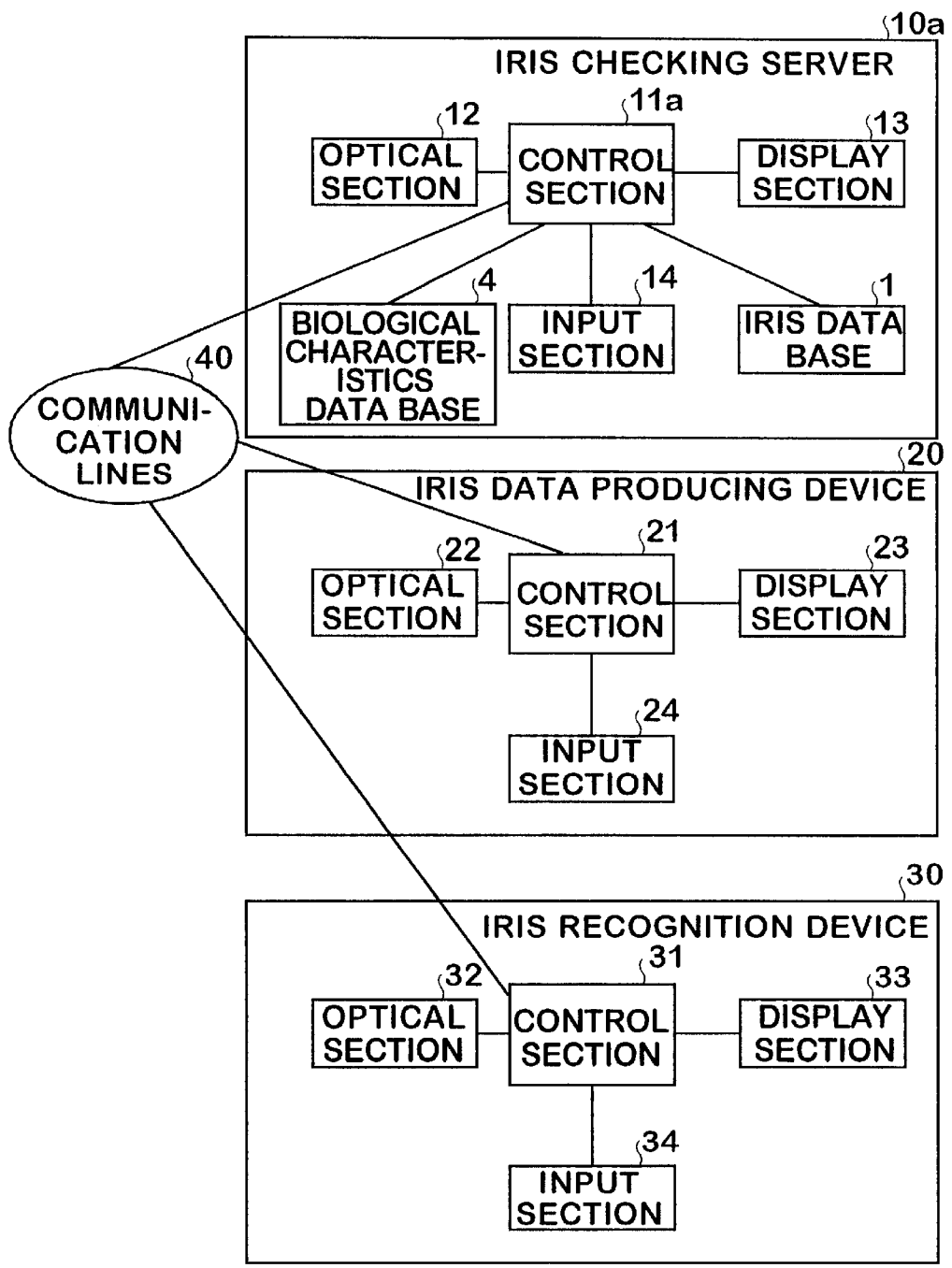
FIG. 6 is a block diagram showing an iris recognition system to implement the iris registration unit of the second embodiment of the present invention.

FIG. 6 is a block diagram showing an iris recognition system to implement the iris registration unit of the second embodiment of the present invention. The iris recognition system of the second embodiment differs greatly from that of the first embodiment in that a biological characteristics data base 4 is provided in an iris checking server 10a. The biological characteristics similarity judging means 5 is implemented in the control section 11a. A face image data of a new registrant is obtained by an optical section 22 of an iris data producing device 20 or an optical section 12 of an iris checking server 10a. Other configurations except these of the second embodiment are the same as those of the first embodiment and descriptions of them are omitted accordingly.

Figure 7:
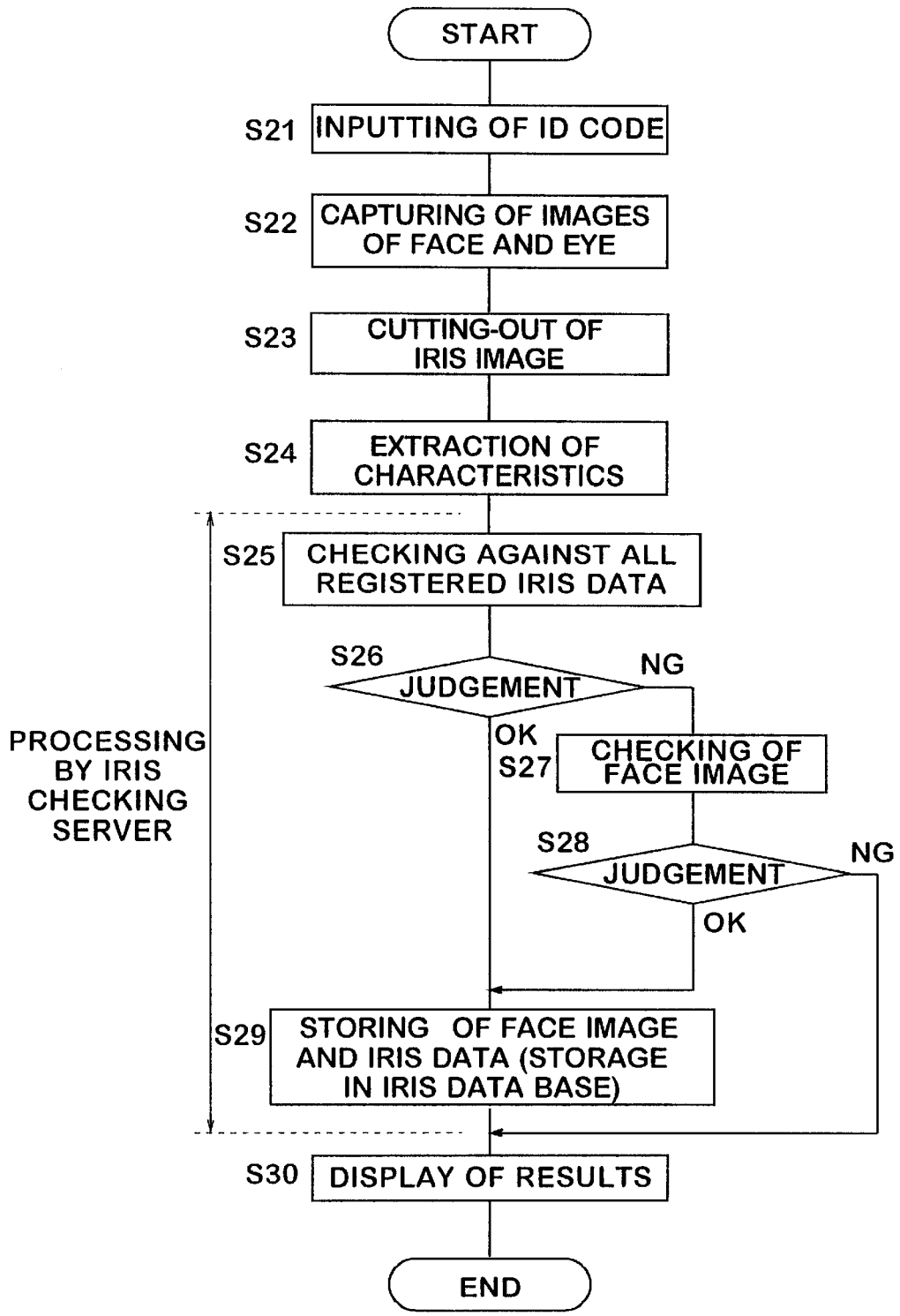
FIG. 7 is a flow chart showing iris registration operations of the second embodiment of the present invention.

FIG. 7 is a flow chart showing operation of the iris registration of the iris recognition system of the second embodiment of the present invention.

In the iris data producing device 20, an ID code of an unregistered user is inputted from the input section 24 such as a keyboard, card reader or the like (Step S21).

Next, an eye and face image of the unregistered user is captured by the optical section 22 of the iris data producing device 20 (Step S22). To obtain the image, different cameras, one for a face image and the other for an eye image, may be used or a camera in common for both images may be used.

Then, the iris image is cut out from the eye image by the control section 21 (Step S23), where a boundary between an external edge and an internal edge is detected. Then, a predetermined amount of the cut-out iris image characteristics is extracted from the iris image and coded by the control section 21 (Step S24). The iris data is linked with ID code as personal identification provided to an unregistered user, fed to the iris checking server 10a, together with the face image data, via communication lines 40. The fed iris data is checked, by the control section 11a of the iris checking server 10a, against all iris data registered and stored in the iris data base 1 (Step S25).

The checking is implemented, as in the first embodiment, by an arithmetic operation of degree of non-similarity between the iris data fed and the iris data already registered. A comparison between the degree of non-similarity data d1, d2, d3, ..., dn (the "n" represents the number of the iris data already registered) and the threshold value D is made and whether data being similar to the iris data to be newly registered exists or not is judged by the control section 11a (Step S6).

If the degree of non-similarity data "d1" to "dn" obtained from the checking exceed the threshold value D (i.e., d>D), it shows that no iris data being very similar (or almost the same as) to that to be newly registered exists in the iris data base 1 and therefore the control section 11 (the registration judging means 3a) judges the new registration to be not a double one, and the iris data of the unregistered user and the face image data are stored (or registered) in the iris data base 1 and the biological characteristics data base 4 (Step S29).

On the other hand, at Step S6, if there is data "d" being not more than the threshold value D (d≦D) out of the degree of non-similarity data d (dS1, dS2, ..., dSm) obtained by checking, it shows that iris data being similar (almost the same as) to that to be newly registered exists in the iris data base 1 and therefore the control section 11a judges the new registration possibly to be a double (or multiple) one.

In the judgement processing at Step S6, if the new registration is judged to be possibly a double one, the control section 11 (the biological characteristics similarity judging means 5 in FIG. 5) is adapted to retrieve the face image data of each existing registrant corresponding to the registered iris data judged to have the similarity from the biological characteristics data base 4 and to check a degree of non-similarity data e1, e2, ..., ej (the "j" represents the number of registered face image data judged to have the similarity) between these face image data and the face image data of the unregistered user (Step 27).

The control section 11a (registration judging section 3a) is adapted to make a check as to whether a degree of non-similarity data dy being not more than a predetermined threshold value Df (dy≦Df) out of degree of non-similarity data e1, e2, ..., ej exists or not, and if the result of the checking at Step 27 shows that the dy exists, the control section 11a judges the registration to be a double (multiple) one (Step S28).

On the other hand, if the result of the checking at Step S27 shows that all the degree of non-similarity data e1, e2, ..., ej exceed the threshold value Df (dy>Df), the control section 11a judges the registration to be not a double one (Step S28).

At Step S28, if the new registration is judged to be not a double one, the control section 11a stores the iris data to be newly registered in the iris data base 1 and the face image data into the biological characteristics data base 4 (Step S29). The results from above processing are fed to the iris data producing device 20 and displayed on the display section 23 (Step S30).

According to the second embodiment, the iris registration unit is so configured that, if registered iris data exists which has similarity exceeding a predetermined degree of similarity out of all registered iris data stored in the iris data base 1, personal identification is authenticated by checking the face image data corresponding to the registered iris data against face image data of an unregistered user, and therefore a double registration by a same registrant and wrong recognition that a registration of iris data by a different user is recognized to be a double (or multiple) registration of a same user can be prevented, thus allowing iris data with great accuracy to be registered.

Third Embodiment

In the second embodiment, the control section 11a (the biological characteristics similarity judging means 5) is adapted to check the face image data of an unregistered user against corresponding the face image data out of the biological characteristics data base and to judge, on the basis of degree of similarity obtained the checking, as to whether a registration is a double one or not, however, according to this third embodiment, a face image may be displayed on the basis of corresponding face data stored in the biological characteristics data base 4.

In addition to configurations of the second embodiment, the iris registration unit of the third embodiment is configured so as to display a face image on the basis of face image data stored in the biological characteristics data base 4.

FIG. 8 is a block diagram showing an iris registration unit according to the third embodiment of the present invention. As shown in FIG. 8, the iris registration unit of the third embodiment is comprised of an iris data base 1, an iris degree of similarity judging means 2, a registration judging means 3b, a biological characteristics data base 4, a biological characteristics similarity judging means 5a and a displaying means 6. Configurations except the biological characteristics similarity judging means 5a and the registration judging means 3b are the same as those in the second embodiment and the description of them is omitted accordingly.

The biological characteristics similarity judging means 5a, if registered iris data having similarity exceeding the degree of predetermined similarity is judged to exist, is adapted to judge the degree of similarity between face image data showing characteristics of an unregistered user and all face image data (or registered biological characteristics data) stored in the biological characteristics data base 4, and to output not only the judgement result but also face image data corresponding to registered iris data having similarity exceeding the degree of predetermined similarity to the displaying means 6.

Operations of the biological characteristics similarity judging means 5a and the iris degree of similarity judging means 2 are implemented by the control section 11a shown in FIG. 6.

Operations of the displaying means 6 in FIG. 8 are implemented on the display section 23 of the iris data producing device 20 shown in FIG. 8, which is comprised of a CRT or LCD.

The registration judging means 3b is adapted to judge as to whether iris data is registered or not on the basis of information about a degree of similarity fed from the iris degree of similarity judging means 2 and also on the basis of information about a degree of similarity fed from the biological characteristics similarity judging means 5a. Then, the registration judging means 3b, if biological characteristics of iris data inputted by an instruction of an operator are judged to have non-similarity, is adapted to register the inputted iris data in the iris data base 1.

Operations of the iris registration unit of the third embodiment are the same as those of the second embodiment. According to the third embodiment, if registered iris data having similarity exceeding the degree of a predetermined similarity exists, a face image data corresponding to the registered iris data is retrieved from the biological characteristics data base 4 and is displayed on the display section 23. Moreover, a result of judgement made by the biological characteristics similarity judging means 5a (which is implemented by the control section 11a in FIG. 6) is also displayed on the display section 23.

An operator of the iris data producing device 20 observes a face image to check as to whether the result of judgement made by the biological characteristics similarity judging means 5a indicating the existence of non-similarity is correct or not. If the result of the judgement is confirmed by operator to be correct, the operator instructs the registration judging means 3b to register the iris data and the obtained face image in the iris data base 1.

Thus, according to the third embodiment, both the face image corresponding to iris data having similarity and the result of the judgement made by the biological characteristics similarity judging means 5a are displayed, enabling visual checking of an operator and iris registration with high accuracy.

In the third embodiment described above, the processing of judging the degree of similarity by the biological characteristics similarity judging means 5a is not necessarily required. That is, if the iris degree of similarity judging means 2 judges that there exists registered iris data having similarity exceeding the degree of a predetermined similarity, a face image data corresponding to the registered iris data stored in the biological characteristics data base 4 is fetched and the face image is displayed on the displaying means 6. An operator observes the face image on the displaying means 6 and checks as to whether a face of an unregistered user to be registered at present is similar to that registered already. Only when the checking result shows that there is no face image having similarity, the operator instructs the registration judging means 3b to register the new iris code in the iris data base 1.

It is apparent that the present invention is not limited to the above embodiments but may be changed and modified without departing from the scope and spirit of the invention.

For example, in the second and third embodiments, though a face image of a user is used as an amount of the iris image characteristics, the present invention is not limited to this method, that is, such various biological characteristics as a fingerprint, a voice or the like may be employed as well.

What is claimed is:

1. An iris registration unit for registering iris data obtained from an unregistered user in an iris data base, the iris registration unit comprising:

iris similarity judging means for judging a degree of similarity between said iris data obtained from said unregistered user and registered iris data already registered in said iris data base;

registration judging means for judging, based on said degree of similarity judged by said iris similarity judging means, whether to register or not register said iris data obtained from said unregistered user in said iris data base;

a biological characteristics data base in which biological characteristics data, other than iris data, is registered showing biological characteristics corresponding to registered iris data stored in said iris data base; and displaying and controlling means, for displaying biological characteristics based on said biological characteristics data stored in said biological characteristics data base when a judgment is made as to whether there is a similarity or not is made by said registration judging means.

2. The iris registration unit according to claim 1, wherein said biological characteristics data is face image data.

3. An iris registration unit for registering iris data obtained from an unregistered user in an iris data base, the iris registration unit comprising:

a biological characteristics data base in which biological characteristics data, other than iris data, is registered showing biological characteristics corresponding to registered iris data stored in said iris data base;

iris similarity judging means for judging a degree of similarity between said iris data obtained from said unregistered user and said registered iris data base;

biological characteristics similarity judging means for judging a degree of similarity between said biological characteristics data obtained from said unregistered user and registered biological characteristics data stored in said biological characteristics data base; and registration judging means for judging whether to register or not register said iris data obtained based on said degree of similarity to said registered iris data judged by said iris similarity judging means and, if similarity exists, for further judging whether to register or not register said iris data obtained based on said degree of similarity judged by said biological characteristics similarity judging means between said biological characteristics data obtained and said registered biological characteristics data.

4. The iris registration unit according to claim 3, further comprising displaying and controlling means for displaying biological characteristics based on corresponding registered biological characteristics data when said biological characteristics data obtained is judged by said registration judging means to have no similarity.

5. The iris registration unit according to claim 3, wherein said biological characteristics data is face image data.

* * * * *